Dec. 20, 1955  B. W. PRINCE  2,727,436
OPHTHALMIC MOUNTINGS
Filed July 29, 1950  2 Sheets-Sheet 2
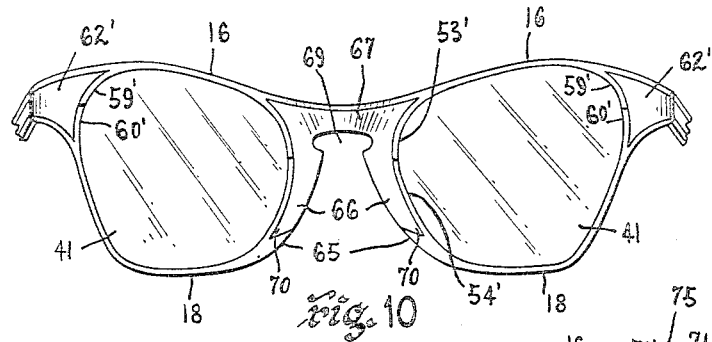
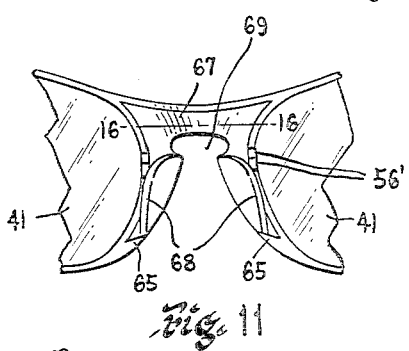
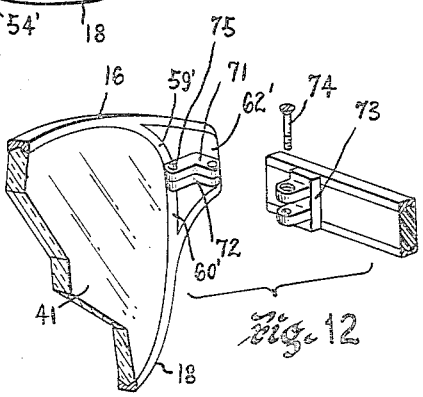
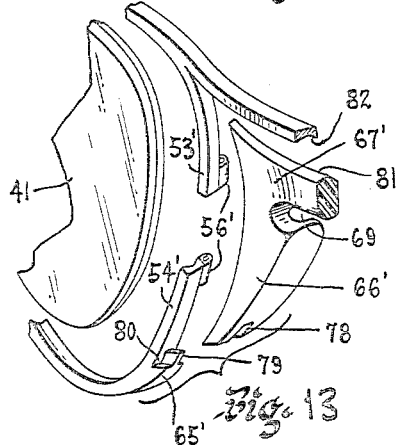
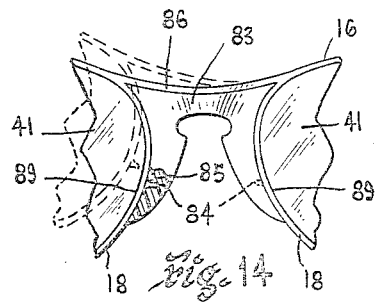
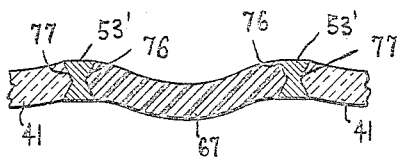
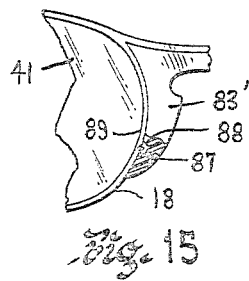
INVENTOR
BASIL W. PRINCE
BY
*Louis H. Gagnon*
ATTORNEY United States Patent Office 2,727,436
Patented Dec. 20, 1955

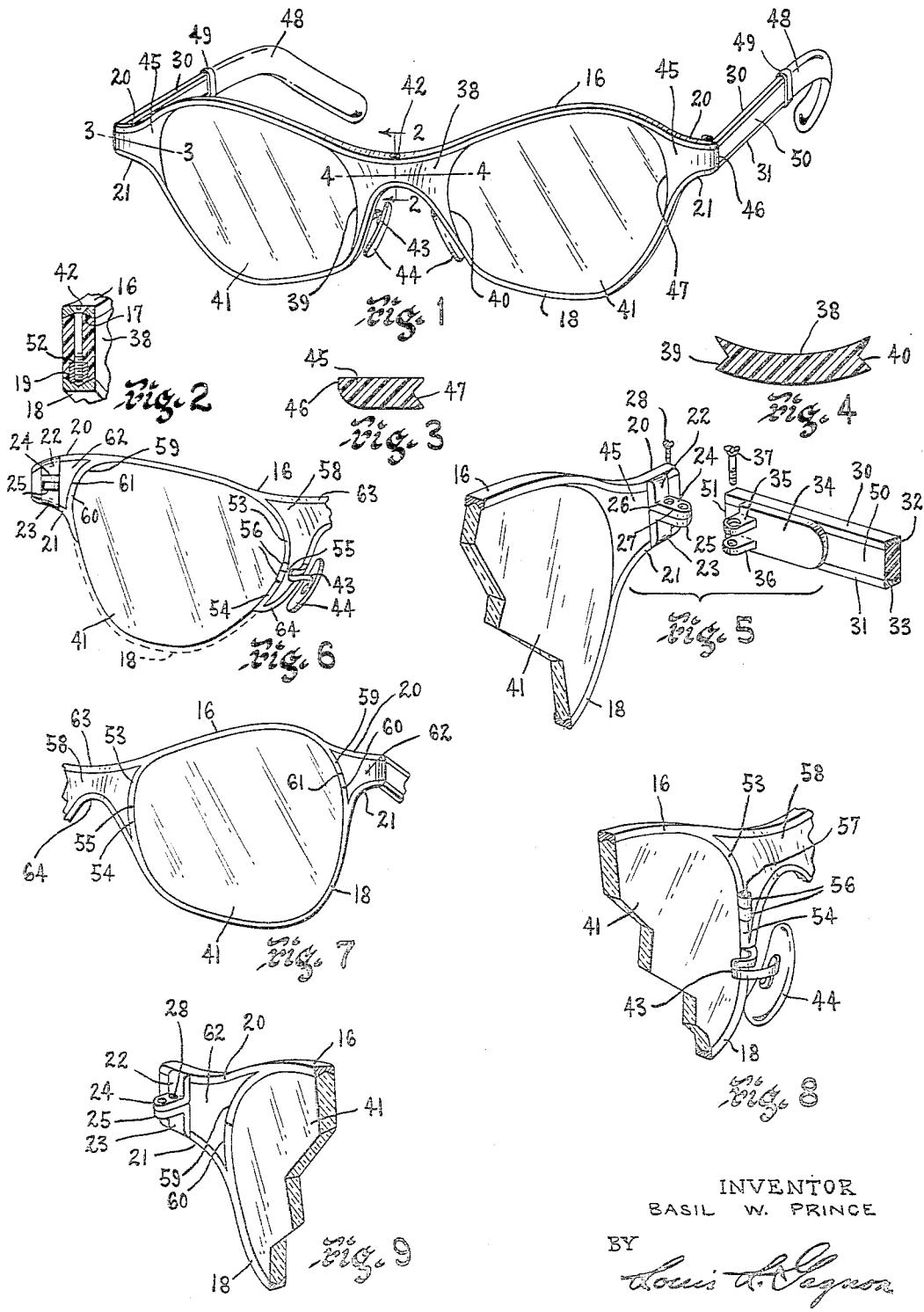

1

2,727,436

OPHTHALMIC MOUNTINGS

Basil W. Prince, Southbridge, Mass., assignor to American Optical Company, Southbridge, Mass., a voluntary association of Massachusetts Application July 29, 1950, Serial No. 176,635

18 Claims. (Cl. 88—41)

This invention relates to improvements in ophthalmic mountings and has particular reference to novel means and method of making the same.

One of the principal objects of the invention is to provide an ophthalmic mounting formed of combined metal and non-metallic parts wherein mountings of several different shapes may be quickly and relatively inexpensively formed and wherein parts having different dimensional characteristics according to the requirements of different wearers may be quickly and easily interchanged and formed into a completed mounting according to the individual's needs and method of making same.

Another object is to provide mountings of the above character which are exceedingly light in weight and comfortable when in position of use on the face of the wearer and wherein the various parts may be formed of portions of different colors so that various cosmetic effects may be simply and easily produced, and method of making same.

Another object is to provide novel means and method of assembling the parts wherein they may be quickly and easily interchanged as desired.

Another object is to provide a mounting of the above character with bridge portions of varying sizes formed in accordance with the requirements of different individuals and wherein said bridge portions may be quickly and easily assembled with the main supporting part of the mounting.

Another object is to provide a mounting having its main supporting portion formed of metal and further embodying non-metallic inserts controlled as to certain dimensional characteristics of the main supporting structure wherein the said parts may be quickly and easily interchanged with other parts of similar dimensional characteristics and with said parts having different fitting values according to the requirements of a particular individual for whom the mounting is being formed and method of making same.

Another object of the invention is to provide an ophthalmic mounting having combined metal and non-metallic supporting parts for the lenses to be used with said mounting.

Other objects and advantages of the invention will become apparent from the following description taken in connection with the accompanying drawings and it will be apparent that many changes may be made in the details of construction, arrangement of parts, and methods shown and described without departing from the spirit of the invention as expressed in the accompanying claims. The invention, therefore, is not limited to the exact details of construction, arrangement of parts, and methods shown and described as the preferred only are given by way of illustration.

Referring to the drawings:

Fig. 1 is a front perspective view of a mounting embodying the invention;

Fig. 2 is an enlarged sectional view taken on line 2—2 of Fig. 1 and looking in the direction of the arrows;

2

Fig. 3 is a slightly enlarged sectional view taken as on line 3—3 of Fig. 1;

Fig. 4 is a slightly enlarged sectional view taken as on line 4—4 of Fig. 1;

Fig. 5 is an enlarged fragmentary rear perspective view of the endpiece and temple connection of the mounting illustrated in Fig. 1 showing the parts in disassociated relation with each other;

Fig. 6 is a fragmentary rear elevational view of a modified form of the invention;

Fig. 7 is a fragmentary front elevational view of a modified form of the invention;

Fig. 8 is a fragmentary rear perspective view of the nasal area of the mounting illustrated in Fig. 7;

Fig. 9 is a fragmentary rear perspective view of the temporal area of the mounting illustrated in Fig. 7;

Fig. 10 is a front elevational view of a further modification of the invention;

Fig. 11 is a rear elevational view of the nasal area of the mounting illustrated in Fig. 10;

Fig. 12 is an enlarged rear perspective view of the temporal area of the mounting illustrated in Fig. 10 and showing the endpiece and temple in disassociated relation with each other;

Fig. 13 is an enlarged fragmentary perspective view of the nasal area of a further modification of the invention showing the parts in disassociated relation with each other;

Fig. 14 is a fragmentary front elevational view of the nasal area of a mounting embodying a further modification of the invention;

Fig. 15 is a fragmentary view generally similar to Fig. 14 illustrating a still further modification of the invention; and Fig. 16 is an enlarged fragmentary sectional view taken as on line 16—16 of Fig. 11.

Referring to the drawings wherein like characters of reference designate like parts throughout the several views, the mounting illustrated in Figs. 1 through 5 comprises a long and slender bar-like member 16 of metallic material shaped to the contour shape desired of the upper portion of the mounting throughout the endpieces, lenses and bridge. The said bar-like member 16 has an inner bevel 17, as illustrated in Fig. 2, which extends throughout the length thereof. The mounting further embodies a long and slender bar-like member 18 of metallic material which is shaped to the contour shape desired of the mounting throughout the bottom of the endpieces, lenses, and bridge and is also provided with an inner bevel 19 extending throughout the length thereof. The opposed ends 20 and 21 of the respective bar-like members 16 and 18 which constitute the upper and lower portions of the endpieces are provided, in the rear thereof, with plate members 22 and 23 which are secured to said end portions 20 and 21 by soldering or other suitable means. The said plate members 22 and 23 are each provided with rearwardly extending ears 24 and 25 shaped to lie in superimposed relation with each other with each of said ears having spaced aligned openings 26 and 27 formed therein. The opening 26, formed in the ear 25, is provided with a threaded bore adapted to receive a suitable connection screw 28. The screw 28 is adapted to extend through the opening 26 in the upper ear 24 and is threaded in the threaded opening 26 in the ear 25 to secure the end portions 20 and 21 in fixed relation with each other.

The temple, in this instance, embodies spaced bar-like portions 30 and 31 each having a V-shaped bevel 32 and 33 internally thereof, and joined by a hinge plate 34 adjacent the forward ends thereof as by soldering or other suitable means. The hinge plate 34 is provided with spaced ears 35 and 36 adapted to straddle the ears 24 and 25. The said ears 35 and 36 are provided with aligned openings with the opening in the ear 36 being threaded to receive a screw 37 by which the temple is pivotally connected with the ears 24 and 25.

The bar-like members 16 and 18, intermediate the nasal or central portions thereof, are provided with a nasal insert 38 preferably formed of non-metallic material having its upper and lower edges shaped to receive the adjacent beveled surfaces of the said bar-like members at said location. The insert 38 is provided, on its opposed sides 39 and 40 (Fig. 4), with a shape corresponding to the contour shape of the nasal edges of the lenses 41 to be used in the mounting, and are provided with bevels similar to the bevels 17 and 19 of the bar-like members 16 and 18 so that, when assembled with said bar-like members, the bevels will form a continuation of the inner bevels of said portions of the bar-like members 16 and 18 which engage the upper and lower edges of the lenses. The insert 38 is shown as being secured in position of use by a screw or the like 42. It is to be understood, however, that any suitable connection means may be used and that one or more thereof may be employed. The upper and lower edges of said nasal insert 38 are beveled, as shown in Fig. 2, to fit within the bevels 17 and 19 throughout the engaging surfaces of said insert 38 and said bar-like members 16 and 18. The bar-like member 18, on the opposed sides of the recess formed by the nasal portion thereof, is provided with spaced rearwardly extending nose pad supporting arms 43 which are secured to said bar-like portion 18 by soldering or other suitable means and to which suitable nose pads 44 may be rigidly or pivotally connected.

Suitable temporal inserts 45 are positioned between the end portions 20 and 21 and are also provided throughout their upper and lower edges with a bevel to fit within the bevels 17 and 19 of said respective bar-like members 16 and 18. The outer end 46 of each temporal insert 45 is formed substantially flush with the end surfaces of said portions 20 and 21, and the opposed end 47 of each insert is provided with a shape corresponding to the contour shape of the temporal edge of the respective lens 41 and is beveled to receive said contour edge of the lens. The said bevels extend throughout the portion 47 and blend with the bevels 17 and 19 of the bar-like members to form a continuous groove throughout the contour of the lens. It is to be understood, of course, that the upper and lower edges of the temporal inserts 45 are shaped to correspond to the shapes of the adjacent portions of the bar-like members 16 and 18. The said inserts 45 are held in position by the connection screws 28.

The bar-like portions 30 and 31 of the respective temples are attached at the rearmost ends thereof to suitable head-engaging end portions 48. This may be accomplished by soldering the rearmost ends of the bar-like portions 30 and 31 to suitable collars 49 in which the end portions 48 of the temples may be anchored. The said end portions 48 may be formed of any suitable material, that is, either non-metallic or metallic as desired. Intermediate each of the bar-like portions 30 and 31, there is positioned a temple insert 50, preferably of non-metallic material, although said insert 50 may be of metal, if desired. Each of the said temple inserts 50 is provided with upper and lower beveled edges to fit within the respective grooves 32 and 33 of the bar-like portions and the forward end 51 of the insert 50 is formed substantially flush with the forward ends of the bar-like portions 30 and 31.

Although the nasal and temporal inserts 38 and 45 are specified as being formed preferably of non-metallic material, it is to be understood that they may be formed of metal or any other desired material, as is true of the temple inserts 50.

It is pointed out that the nasal and temporal inserts 38 and 45 may be formed to different colors or surface configurations and may be quickly and easily interchanged by simply removing the connection screws 28 or 42 as the case may be. The said temple inserts 50 may also be formed to different colors or configurations and may be interchanged by sliding the inserts 50 in a forward direction to remove them from between the said spaced bar-like portions 30 and 31, whereupon a new insert may be merely slid into position between said portions.

The mounting, as described above, has lens supporting means in the form of a beveled groove formed in contiguously related parts made of metal and non-metallic materials with the beveled groove being, in effect, a continuous channel for receiving the beveled edge of the lens.

The screw 42 is preferably threaded internally of the threaded bore of a tubular member 52 (Fig. 2) which is in turn soldered or otherwise attached to the bar-like member 18. It is to be understood, of course, that the insert 38 has a counterbore therein for receiving said tubular member and which is in alignment with the opening extending through said insert and through which the connection screw 42 extends.

In Figs. 6, 7, 8 and 9, there is illustrated a modification wherein the bar-like members 16 and 18 are provided with nasal portions 53 and 54 having meeting ends 55 held in connected relation with each other by means of tubular members 56 which are secured to the rear of said nasal portions 53 and 54 by solder or the like and which are connected to one another by a screw or other connecting means 57. The nasal insert 58 which is similar in nature to the nasal insert 38, in this instance is shaped to fit the contour shape of the nasal portions 53 and 54, and said nasal portions 53 and 54 each may be provided with a beveled groove in which beveled edges formed on the sides of said insert may be fitted. In this instance, the nasal portions 53 and 54 are provided in the sides thereof directed toward the lenses 41 with beveled grooves blending with the grooves in the members 16 and 18 to receive the nasal edges of the lenses 41.

The said bar-like members 16 and 18 are also provided in the temporal areas with endpiece portions 59 and 60 having meeting ends 61 and having inner bevels to receive the adjacent temporal edges of the respective lenses. Each temporal insert 62 has its side toward said endpiece portions 59 and 60 shaped to fit intimately therewith. The endpiece construction is otherwise generally similar to that shown in Fig. 5 and described in connection with the mounting of Fig. 1. If desired, the endpiece portions 59 and 60, as well as having inner beveled grooves, may be provided with outer beveled grooves to receive beveled edges formed on the inner sides of the temporal inserts 62 whereby the said inserts will not only fit throughout their upper and lower edges inwardly of the bevels of the bar-like members 16 and 18 but will also fit within the outer bevels of the endpiece portions 59 and 60. The said inserts 58 and 62 are provided with characteristics similar to those described in connection with the respective inserts 38 and 45, that is, they may be made to different interchangeable colors and may be made of non-metallic, metal or other suitable material as desired.

The nasal portions 53 and 54 and temporal portions 59 and 60 may be formed as separate pieces joined with the bar-like members 16 and 18 as by soldering or other suitable means, or the end portions 20 and 21 may be formed separately and secured to the bar-like members 16 and 18 by soldering or other suitable means, in which instance, the endpiece portions 59 and 60 are integral with the members 16 and 18. This is also true of the upper and lower portions 63 and 64 (Figs. 6 and 7) of the central or bridge portion of the mounting, that is, the nasal portions 53 and 54 may be formed integral with the bar-like members 16 and 18 in which instance the portions 63 and 64 may be separate and soldered or otherwise connected to said members 16 and 18.

The end portions 20 and 21 in the modified construction have the plate members 22 and 23 formed with perforated ears 24 and 25 connected thereto as by soldering or other suitable means in a manner similar to the construction shown in Fig. 5 whereby the insert 62 may be removed and interchanged by removal of the connection screw 28.

The bar-like members 18, on the nasal sides thereof, are provided with the rearwardly extending pad arms 43 to which suitable nose pads 44 are rigidly or loosely connected.

With this construction, a semi-rimless structure can be easily provided by elimination of a portion of the lower bar-like member 18 between the ends 21 and the portion 64 thereof which forms the underside of the bridge, as shown by the dotted line in Fig. 6. Means other than the tubular members 56 and screws 57 may, of course, be used to secure the portion 64 and nasal insert 58 to the upper bar-like member 16 such as one or more of the screws 42 as shown in Figs. 1 and 2. It is to be understood, however, that in the absence of specific means for securing the lenses to the supporting structure, the portions 54 and 21 must be spaced apart at their lower ends a distance amounting to less than the width of the lenses above the points of engagement of the ends of the portions 54 and 21 therewith. Thus, the lenses will be retained in the desired positions when assembled with the supporting structure.

It is to be further understood that a semi-rimless mounting can be formed in accordance with the preferred embodiment shown in Fig. 1 by eliminating the nasal portions 53—54 and temporal portions 59—60, in which case the screws 42 will serve to secure the nasal parts of the assembly together while the endpiece parts will be secured in the manner shown in Fig. 5.

In Figs. 10, 11, and 12, there is illustrated a further modification which embodies a construction generally similar to that of the modification illustrated in Figs. 6, 7, 8 and 9 with the exception that the nasal portions of the lower bar-like member 18 are provided with upwardly angled tapered lugs 65 adapted to receive the lower extremities of the depending side portions 66 of the nasal insert 67. With this construction it will be noted that the bar-like member 18 is not continuous throughout the bridge of the mounting. The insert, in this instance, is provided with integral nose bearing pads 63 and is adapted to be formed to different dimensional characteristics in accordance with the requirements of different individuals whereby an insert of the desired color and pad spacing and angling may be secured to the general supporting structure of the mounting in accordance with the individual's requirements. It is to be understood that the general outer contour shapes of the inserts and the dimensional characteristics thereof are the same in all instances, that is, they are made to fit the associated parts of the lens supporting structure and the pads and keyhole 69 are altered in size and spaced relation with each other in accordance with the different dimensional characteristics required for different individuals. The insert 67 is held in position by the tubular members 56' and by the screw member 57 such as shown in Fig. 8.

Due to the fact that the extreme ends 70 of the depending side portions of the insert 67 are shaped to fit within the notches formed by the upwardly angled lugs 65, there will be no danger of the inserts becoming disconnected during use of the mounting.

There is a further modification in the construction shown in Figs. 10 through 12 in that the temple connection lugs 71 and 72, to which the hinge plate 73 of the temple is pivotally connected as by the screw or the like 74, are attached to the respective divided ends of the endpiece portions 59' and 60' as by soldering or the like, as illustrated in Fig. 12, and the said portions 59' and 60' are held in connected relation with each other as by a screw or other suitable means 75. The screw 75 not only holds the hinge lugs 71 and 72 in superimposed relation with each other but also holds the insert 62' therein. This temple hinge construction is, of course, also suitable for use with the semi-rimless structure described hereinbefore. The said inserts 62' and 67 may be formed of non-metallic, metallic or other suitable material and to different colors or surface configurations, as desired, in a manner similar to those of the previously described structures. The nasal portions 53' and 54', as well as the endpiece portions 59' and 60', may be provided with a beveled groove 76, as shown in Fig. 16, to receive a similarly beveled edge formed on the sides of the inserts 67 and 62' as desired. The said portions are also provided with an inner V-shaped bevel 77 to receive the adjacent beveled edges of the lenses.

In Fig. 13, there is illustrated a slight further modification wherein the lower ends of the depending side portions 66' of the nasal insert 67' are provided with notches 78 to receive upwardly extending fins 79 provided in the notches 80 formed by the upwardly angled projections 65'. In this instance, the portions 53' and 54' do not have the outer beveled groove 76 therein, as shown in Fig. 16, and the fins 79 fitting within the notches 78, together with the upper beveled edge 81 on the insert 67' which fits within the beveled groove 82, are depended upon to retain the insert in position when the meeting ends of the portions 53' and 54' are secured together by the tubular members 56', as described in connection with the constructions shown in Figs. 8 and 11. This construction is also obviously adaptable to a semi-rimless construction by removal of the portions of the lower bar-like member which engage the lower edges of the lenses.

In Fig. 14, there is shown another slight modification wherein the outer surfaces of the depending side portions of the nasal insert 83 are provided with recesses 84 in which pin-like projections 85 formed on the nasal sides of the portions 89 of the member 18 are adapted to extend and hold the insert 83 in position as by the spring action of the overlying central bridge portion 86. The portions 89 encircle the nasal sides of the lenses and are directly connected as by soldering or the like to the upper bar-like member 16. It is to be understood that the bridge portion 86 of member 16 is provided with an inner beveled groove adapted to receive an upper beveled edge formed on the insert 83 in a manner similar to the previously described nasal inserts. By spreading the bar-like lens encircling members 18 an amount sufficient to permit the insert 83 to be fitted with the bridge section 86 and thereafter releasing the members 18 and allowing the pins 85 to be moved inwardly of the openings or recesses 84 and to be held therein by the spring action of the bridge section 86, the said insert will be securely held in position.

In Fig. 15, there is illustrated a still further slight modification wherein instead of providing the pins or projections 85 fitting within the recesses 84 in the nasal insert, the said insert 83' may be provided with an opening in each of the depending ends thereof through which a connection screw or the like 87 may be extended. The said connection screw 87 is adapted to be threaded inwardly of a threaded bore formed in a tubular portion 88 secured to the nasal sides of the rim 89 by solder or other suitable means. The mounting is otherwise constructed generally similar to the mounting shown in Figs. 10 through 12. It is to be understood that the rims 89 are divided on the temporal sides thereof in a manner similar to the construction shown in Fig. 11 and it is further to be understood that the inserts 83 and 83' may be formed to different colors and of different materials such as specified above in connection with similar nasal inserts.

The constructions shown in Figs. 14 and 15 can be still further modified to form semi-rimless structures simply by elimination of the portions of the lower bar-like member 18 which encircle the lower edges of the lenses.

From the foregoing description, it will be seen that a novel arrangement has been provided wherein a relatively light frame structure of either full rim or semi-rimless type is formed with inserts which are interchangeable to produce different desired color effects as well as to provide different fitting qualities in accordance with the requirements of different individuals. In dispensing such mountings, the dispenser is provided with the main frame structure and with a plurality of inserts of different colors and different sizes as mentioned above in connection with the bridge portion of the mounting and can select these inserts in accordance with the particular individual's requirements and assemble them with the supporting frame structure to complete the mounting.

It is further to be understood that the inserts are so controlled as to size and shape as to interchangeably fit with a particular main frame structure and that the various nasal inserts may be provided with integral or cement-on type nose pads such as shown at 68 in Fig. 11.

It is further to be understood that although the foregoing description has specified said bar-like members as being formed of metal, other desirable and known materials may be used.

I claim:

1. A supporting structure for the lenses of an ophthalmic mounting of the type embodying a central bridge piece and temporal endpieces, said supporting structure comprising a long and narrow thin bar-like member of uniform cross sectional shape extending throughout the width of the upper portion of the mounting and having a central portion shaped to the upper contour shape of the bridge piece, portions progressing outwardly from said central portion shaped substantially to the upper contour shape of the lenses and terminating in portions shaped to the upper contour shape of the endpieces, retaining means of similar cross section extending throughout the width of the lower portion of the mounting and having a central portion shaped to engage the lower edge of the bridge piece in spaced relation with the portion of the bar-like member overlying the upper edge of said bridge piece, portions extending outwardly from said central portion shaped substantially to the lower contour shape of the lenses and terminating in portions shaped to the lower contour shape of the endpieces, means connecting said spaced central portions of the retaining means and bar-like member with each other to hold the bridge piece in assembled relation with the supporting structure, and a pair of members one being connected to said portion shaped to the lower contour shape of the endpieces and the other being connected to the portion of the upper bar-like member which overlies the endpieces said members having aligned perforations and connection means extending therethrough for retaining said endpieces in assembled relation therewith, said retaining means being adapted to function cooperatively with the bar-like member to retain the lenses in assembled relation with said supporting structure.

2. A supporting structure for the lenses of an ophthalmic mounting of the type embodying a central bridge piece and temporal endpieces, said supporting structure comprising a long and narrow thin bar-like member of substantially uniform cross-sectional shape extending throughout the width of the upper portion of the mounting and having a central portion shaped to the upper contour shape of the bridge piece, portions progressing outwardly from said central portion shaped substantially to the upper contour shape of the lenses and terminating in portions shaped to the upper contour shape of the endpieces, retaining means of similar cross-section extending throughout the width of the lower portion of the mounting and having a central portion shaped to engage the lower edge of the bridge piece in spaced relation with the portion of the bar-like member overlying the upper edge of said bridge piece, portions extending outwardly from said central portion shaped substantially to the lower contour shape of the lenses and terminating in portions shaped to the lower contour shape of the endpieces, means connecting said spaced central portions of the retaining means and bar-like member with each other comprising a removable member extending through said bar-like member, bridge piece, and retaining means to detachably hold the bridge piece in assembled relation with the supporting structure, and a pair of members one being connected to said portion shaped to the lower contour shape of the endpieces and the other being connected to the portion of the upper bar-like member which overlies the endpieces, said members having aligned perforations and connection means extending therethrough for retaining said endpieces in assembled relation therewith, said retaining means being adapted to function cooperatively with the bar-like member to retain the lenses in assembled relation with said supporting structure.

3. A supporting structure for the lenses of an ophthalmic mounting of the type embodying a central bridge piece and temporal endpieces, said supporting structure comprising a bar-like member extending throughout the width of the upper portion of the mounting and having a central portion shaped to the upper contour shape of the bridge piece, portions progressing outwardly from said central portion shaped substantially to the upper contour shape of the lenses and terminating in portions shaped to the upper contour shape of the endpieces, retaining means extending throughout the width of the lower portion of the mounting and having a central portion shaped to engage the lower edge of the bridge piece in spaced relation with the portion of the bar-like member overlying the upper edge of said bridge piece, portions extending outwardly from said central portion shaped substantially to the lower contour shape of the lenses and terminating in portions shaped to the lower contour shape of the endpieces, means connecting said spaced central portions of the retaining means and bar-like member with each other to hold the bridge piece in assembled relation with the supporting structure, and means connecting said portions shaped to the lower contour shape of the endpieces to the portions of the upper bar-like member which overlie the endpieces comprising a fixed member carried by each of said portions and a removable member connecting the respective fixed members for detachably retaining said endpieces in assembled relation therewith, said retaining means being adapted to function cooperatively with the bar-like member to retain the lenses in assembled relation with said supporting structure.

4. A supporting structure for the lenses of an ophthalmic mounting of the type embodying a central bridge piece and temporal endpieces, said supporting structure comprising a bar-like member extending throughout the width of the upper portion of the mounting and having a central portion shaped to the upper contour shape of the bridge piece, portions progressing outwardly from said central portion shaped substantially to the upper contour shape of the lenses and terminating in portions shaped to the upper contour shape of the endpieces, retaining means extending throughout the width of the lower portion of the mounting and having a central portion shaped to engage the lower edge of the bridge piece in spaced relation with the portion of the bar-like member overlying the upper edge of said bridge piece, portions extending outwardly from said central portion shaped substantially to the lower contour shape of the lenses and terminating in portions shaped to the lower contour shape of the endpieces, means connecting said spaced central portions of the retaining means and bar-like member with each other comprising a removable member extending through said bar-like member, bridge piece, and retaining means to detachably hold the bridge piece in assembled relation with the supporting structure, and means connecting said portions shaped to the lower contour shape of the endpieces to the portions of the upper bar-like member which overlie the endpieces comprising a fixed member carried by each of said portions and a removable member connecting the respective fixed members for detachably retaining said endpieces in assembled relation therewith, said retaining means being adapted to function cooperatively with the bar-like member to retain the lenses in assembled relation with said supporting structure.

5. A supporting structure for the lenses of an ophthalmic mounting of the type embodying a central bridge piece and temporal endpieces, said supporting structure comprising a bar-like member extending throughout the width of the upper portion of the mounting and having a central portion shaped to the upper contour shape of the bridge piece, portions progressing outwardly from said central portion shaped substantially to the upper contour shape of the lenses and terminating in portions shaped to the upper contour shape of the endpieces, retaining means extending throughout the width of the lower portion of the mounting and having a central portion shaped to engage the lower edge of the bridge piece in spaced relation with the portion of the bar-like member overlying the upper edge of said bridge piece, portions extending outwardly from said central portion shaped substantially to the lower contour shape of the lenses and terminating in portions shaped to the lower contour shape of the endpieces, means connecting said spaced central portions of the retaining means and bar-like member with each other to hold the bridge piece in assembled relation with the supporting structure, and means connecting said portions shaped to the lower contour shape of the endpieces to the portions of the upper bar-like member embodying a pair of fixed members which overlie the endpieces one being affixed to each of said respective portions and carrying perforated portions through which means are extendable for retaining said endpieces in assembled relation therewith, said retaining means being adapted to function cooperatively with the bar-like member to retain the lenses in assembled relation with said supporting structure, said bridge piece and endpieces having edge portions shaped to overlie the adjacent edges of the lenses when in assembled relation therewith, the upper and lower contour edges of said bridge piece and endpieces having bevels thereon and the portions of said bar-like member and retaining means which are shaped to the contour shapes of the respective edge of said bridge piece and endpieces having grooves therein for reception of said bevels when the parts are in assembled relation.

6. A supporting structure for the lenses of an ophthalmic mounting of the type embodying a central bridge piece and temporal endpieces, said supporting structure comprising a bar-like member extending throughout the width of the upper portion of the mounting and having a central portion shaped to the upper contour shape of the bridge piece, portions progressing outwardly from said central portion shaped substantially to the upper contour shape of the lenses and terminating in portions shaped to the upper contour shape of the endpieces, retaining means extending throughout the width of the lower portion of the mounting and having a central portion shaped to engage the lower edge of the bridge piece in spaced relation with the portion of the bar-like member overlying the upper edge of said bridge piece, portions extending outwardly from said central portion shaped substantially to the lower contour shape of the lenses and terminating in portions shaped to the lower contour shape of the endpieces, means connecting said spaced central portions of the retaining means and bar-like member with each other comprising a removable member extending through said bar-like member, bridge piece, and retaining means to detachably hold the bridge piece in assembled relation with the supporting structure, and means connecting said portions shaped to the lower contour shape of the endpieces to the portions of the upper bar-like member which overlie the endpieces comprising a pair of fixed members which overlie the endpiece, one being affixed to each of said portions and each carrying a perforated portion through which means are extendable for connecting the respective fixed members for detachably retaining said endpieces in assembled relation therewith, said retaining means being adapted to function cooperatively with the bar-like member to retain the lenses in assembled relation with said supporting structure, said bridge piece and endpieces having edge portions shaped to overlie the adjacent edges of the lenses when in assembled relation therewith, the upper and lower contour edges of said bridge piece and endpieces having bevels thereon and the portions of said bar-like member and retaining means which are shaped to the contour shapes of the respective edge of said bridge piece and endpieces having grooves therein for reception of said bevels when the parts are in assembled relation.

7. A supporting structure for the lenses of an ophthalmic mounting of the type embodying a central bridge piece and temporal endpieces, said supporting structure comprising a bar-like member extending throughout the width of the upper portion of the mounting and having a central portion shaped to the upper contour shape of the bridge piece, portions progressing outwardly from said central portion shaped substantially to the upper contour shape of the lenses and terminating in portions shaped to the upper contour shape of the endpieces, said bar-like member further having spur-like portions shaped to overlie the adjacent nasal and temporal edges of a respective lens when assembled therewith and extending downwardly between said lens and said bridge piece and respective endpiece, retaining means embodying a member shaped to engage at least a portion of the bridge piece in spaced relation with the portion of the bar-like member overlying the upper edge of said bridge piece and having a nasal spur-like portion shaped to overlie the adjacent nasal edge of the lens when assembled therewith, and extending between said lens and bridge piece in a direction toward the adjacent spur-like portion of said bar-like member, and a temporal portion shaped substantially to the lower contour shape of a respective endpiece having a spur-like portion extending between said lens and endpiece in a direction toward the adjacent spur-like portion of said bar-like member, means connecting the nasal spur-like portions of the retaining means and bar-like member with each other comprising connecting members formed on the adjacent ends of each of said spur-like members and a separate removable member connecting said connecting members together to detachably hold the bridge piece in assembled relation with the supporting structure, and means for detachably connecting said temporal spur-like portion of the upper bar-like member which overlies the endpiece for retaining said endpiece in assembled relation therewith, said temporal portion of the retaining means being adapted to function cooperatively with the nasal spur-like portion thereof to retain the lenses in assembled relation with said supporting structure.

8. An ophthalmic mounting comprising a pair of lenses and a lens supporting structure for said lenses of the type embodying a central bridge piece and temporal endpieces, said supporting structure comprising a bar-like member extending throughout the width of the upper portion of the mounting and having a central portion shaped to the upper contour shape of the bridge piece, portions progressing outwardly from said central portion shaped substantially to the upper contour shape of the lenses and terminating in portions shaped to the upper contour shape of the endpieces, retaining means embodying a portion shaped to engage at least a portion of the bridge piece in spaced relation with the portion of the bar-like member overlying the upper edge of said bridge piece and having a portion shaped to overlie the adjacent nasal edge of the lens when assembled therewith, and a portion shaped substantially to the lower contour shape of a respective endpiece, means connecting said spaced portions of the retaining means and bar-like member with each other to detachably hold the bridge piece in assembled relation with the supporting structure, and means for detachably connecting said portion shaped substantially to the lower contour shape of a respective endpiece to the portion of the upper bar-like member comprising a pair of fixed members, one being secured to each of said portions, and means detachably connecting said members together for retaining said endpiece in assembled relation therewith, and to which said temples are pivotally connected, said portion shaped substantially to the lower contour shape of a respective endpiece having a part thereof shaped to overlie at least a portion of the adjacent temporal edge of the lens when assembled therewith, and being adapted to function cooperatively with the portion shaped to overlie the adjacent nasal portion of the lens to retain the lenses in assembled relation with said supporting structure.

9. An ophthalmic mounting comprising a pair of lenses and a lens supporting structure for said lenses of the type embodying a central bridge piece and temporal end pieces, said supporting structure comprising a bar-like member extending throughout the width of the upper portion of the mounting and having a central portion shaped to the upper contour shape of the bridge piece, portions progressing outwardly from said central portion shaped substantially to the upper contour shape of the lenses and terminating in portions shaped to the upper contour shape of the endpieces, retaining means extending throughout the width of the lower portion of the mounting and having a central portion shaped to engage the lower edge of the bridge piece in spaced relation with the portion of the bar-like member overlying the upper edge of said bridge piece, portions extending outwardly from said central portion shaped substantially to the lower contour shape of the lenses and terminating in portions shaped to the lower contour shape of the endpieces, means connecting said spaced central portions of the retaining means and bar-like member with each other to hold the bridge piece in assembled relation with the supporting structure, and a pair of fixed members, one being connected to said portion shaped to the lower contour shape of the endpieces and the other to the portion of the upper bar-like member which overlie the endpieces and means detachably connecting said fixed members for retaining said endpieces in assembled relation therewith, said retaining means being adapted to function cooperatively with the bar-like member to retain the lenses in assembled relation with said supporting structure.

10. An ophthalmic mounting comprising a pair of lenses and a lens supporting structure for said lenses of the type embodying a central bridge piece and temporal endpieces, said supporting structure comprising a bar-like member extending throughout the width of the upper portion of the mounting and having a central portion shaped to the upper contour shape of the bridge piece, portions progressing outwardly from said central portion shaped substantially to the upper contour shape of the lenses and terminating in portions shaped to the upper contour shape of the endpieces, retaining means extending throughout the width of the lower portion of the mounting and having a central portion shaped to engage the lower edge of the bridge piece in spaced relation with the portion of the bar-like member overlying the upper edge of said bridge piece, portions extending outwardly from said central portion shaped substantially to the lower contour shape of the lenses and terminating in portions shaped to the lower contour shape of the endpieces, means connecting said spaced central portions of the retaining means and bar-like member with each other comprising a removable member extending through said bar-like member, bridge piece, and retaining means to detachably hold the bridge piece in assembled relation with the supporting structure, and a pair of fixed members, one being connected to said portions shaped to the lower contour shape of the endpieces and the other to the portion of the upper bar-like member which overlies the endpieces and means detachably connecting said fixed members for retaining said endpieces in assembled relation therewith, said retaining means being adapted to function cooperatively with the bar-like member to retain the lenses in assembled relation with said supporting structure.

11. An ophthalmic mounting comprising a pair of lenses and a lens supporting structure for said lenses of the type embodying a central bridge piece and temporal endpieces, said supporting structure comprising a bar-like member extending throughout the width of the upper portion of the mounting and having a central portion shaped to the upper contour shape of the bridge piece, portions progressing outwardly from said central portion shaped substantially to the upper contour shape of the lenses and terminating in portions shaped to the upper contour shape of the endpieces, retaining means extending throughout the width of the lower portion of the mounting and having a central portion shaped to engage the lower edge of the bridge piece in spaced relation with the portion of the bar-like member overlying the upper edge of said bridge piece, portions extending outwardly from said central portion shaped substantially to the lower contour shape of the lenses and terminating in portions shaped to the lower contour shape of the endpieces, means connecting said spaced central portions of the retaining means and bar-like member with each other to hold the bridge piece in assembled relation with the supporting structure, and means connecting said portions shaped to the lower contour shape of the end pieces to the portions of the upper bar-like member which overlie the endpieces comprising fixed members carried by each of said portions and a removable member connecting the respective fixed members for detachably retaining said endpieces in assembled relation therewith, said retaining means being adapted to function cooperatively with the bar-like member to retain the lenses in assembled relation with said supporting structure.

12. An ophthalmic mounting comprising a pair of lenses and a lens supporting structure for said lenses of the type embodying a central bridge piece and temporal endpieces, said supporting structure comprising a bar-like member extending throughout the width of the upper portion of the mounting and having a central portion shaped to the upper contour shape of the bridge piece, portions progressing outwardly from said central portion shaped substantially to the upper contour shape of the lenses and terminating in portions shaped to the upper contour shape of the endpieces, retaining means extending throughout the width of the lower portion of the mounting and having a central portion shaped to engage the lower edge of the bridge piece in spaced relation with the portion of the bar-like member overlying the upper edge of said bridge piece, portions extending outwardly from said central portion shaped substantially to the lower contour shape of the lenses and terminating in portions shaped to the lower contour shape of the endpieces, means connecting said spaced central portions of the retaining means and bar-like member with each other comprising a removable member extending through said bar-like member, bridge piece, and retaining means to detachably hold the bridge piece in assembled relation with the supporting structure, and means connecting said portions shaped to the lower contour shape of the endpieces to the portions of the upper bar-like member which overlie the endpieces comprising fixed members carried by each of said portions and a removable member connecting the respective fixed members for detachably retaining said endpieces in assembled relation therewith, said retaining means being adapted to function cooperatively with the bar-like member to retain the lenses in assembled relation with said supporting structure.

13. An ophthalmic mounting comprising a pair of lenses and a lens supporting structure for said lenses of the type embodying a central bridge piece and temporal endpieces, said supporting structure comprising a bar-like member extending throughout the width of the upper portion of the mounting and having a central portion shaped to the upper contour shape of the bridge piece, portions progressing outwardly from said central portion shaped substantially to the upper contour shape of the lenses and terminating in portions shaped to the upper contour shape of the endpieces, retaining means extending throughout the width of the lower portion of the mounting and having a central portion shaped to engage the lower edge of the bridge piece in spaced relation with the portion of the bar-like member overlying the upper edge of said bridge piece, portions extending outwardly from said central portion shaped substantially to the lower contour shape of the lenses and terminating in portions shaped to the lower contour shape of the endpieces, means connecting said spaced central portions of the retaining means and bar-like member with each other comprising a removable member extending through said bar-like member, bridge piece, and retaining means to detachably hold the bridge piece in assembled relation with the supporting structure, and means connecting said portions shaped to the lower contour shape of the endpieces to the portions of the upper bar-like member which overlie the endpieces comprising fixed members carried by each of said portions and a removable member connecting the respective fixed members for detachably retaining said endpieces in assembled relation therewith, said retaining means being adapted to function cooperatively with the bar-like member to retain the lenses in assembled relation with said supporting structure, said bridge piece and endpieces having edge portions shaped to overlie the adjacent edges of the lenses when in assembled relation therewith, the upper and lower contour edges of said bridge piece and endpieces having bevels thereon and the portions of said bar-like member and retaining means which are shaped to the contour shapes of the respective edge of said bridge piece and endpieces having grooves therein for reception of said bevels when the parts are in assembled relation.

14. A supporting structure for the lenses of an ophthalmic mounting comprising a pair of long and narrow V-grooved bar-like members of substantially uniform cross section, a central bridge block and a pair of temple end blocks spaced on either side of said bridge block, the upper and lower edge of said respective blocks being beveled and each of said V-grooved bar-like members having their central portion shaped, one to the upper contour and the other to the lower contour of the bridge block and having the respective beveled edges thereof fitting within said V-grooved portion thereof, said V-grooved bar-like members having their opposed end portions shaped to and fitting with the respective beveled upper and lower edges of the pair of temple end blocks, with the intermediate portion of said V-grooved metal bar-like members between the bridge block and the respective temple end blocks being shaped to the respective upper and lower contours of the lenses to be assembled therewith and presenting their V-grooved portions as channels for receiving the upper and lower edges of said lenses, means joining with said central portions of the V-grooved metal bar-like members to retain the bridge block in assembled relation between said portions of the bar-like members, and a pair of plate-like members overlying the rear surface of each of said temple end blocks and each being joined at one end with the end portion of one of said bar-like members, said plate-like members carrying perforated lugs, and connection means extending through the perforations thereof joining said plate-like members in assembled relation.

15. An ophthalmic mounting comprising a pair of lenses, a central bridge block disposed intermediate the lenses, a pair of temple end blocks on the temporal side of said lenses and a pair of long and narrow bar-like members of substantially uniform cross section, each having their central portion shaped, one to the upper contour and the other to the lower contour of the bridge block and having their opposed end portions shaped to and fitting with the respective upper and lower edges of a pair of temple end blocks, with the intermediate portion of said metal bar-like members between the bridge block and the respective temple end blocks being shaped to the respective upper and lower contours of the lenses to be assembled therewith, the inwardly directed side of said bar-like members and the adjacent surfaces of the blocks and lenses being shaped to have portions interfitting with each other, means joining with said central portions of the bar-like members to retain the bridge block in asembled relation between said portions of the bar-like members, and a pair of plate-like members overlying the rear surface of each of said temple end blocks and each being joined at one end with the end portion of one of said bar-like members, said plate-like members carrying perforated lugs, and connection means extending through the perforations thereof joining said plate-like members in assembled relation.

16. A supporting structure for the lenses of an ophthalmic mounting comprising a pair of long and narrow V-grooved bar-like members of substantially uniform cross section, a central bridge block and a pair of temple end blocks spaced on either side of said bridge block, the upper and lower edge of said respective blocks being beveled and each of said V-grooved bar-like members having their central portion shaped, one to the upper contour and the other to the lower contour of the bridge block and having the respective beveled edges thereof fitting within said V-grooved portion thereof, said V-grooved bar-like members having their opposed end portions shaped to and fitting with the respective beveled upper and lower edges of the pair of temple end blocks, with the intermediate portion of said V-grooved metal bar-like members between the bridge block and the respective temple end blocks being shaped to the respective upper and lower contours of the lenses to be assembled therewith and presenting their V-grooved portions as channels for receiving the upper and lower edges of said lenses, each of said bar-like members having spur-like V-grooved portions extending therefrom on the nasal and temporal sides to follow along the lens-edge-directed side of the respective bridge and temple end blocks, said respective nasal and temporal spur-like projections having meeting ends and their V-groove providing with the V-groove of the intermediate portions of the bar-like member a continuous lens edge receiving channel, together with means retaining said bar-like members in assembled relation about said lenses and bridge and temple end blocks.

17. A supporting structure for ophthalmic lenses of the type having a relatively wide top portion and downwardly and inwardly converging nasal and temporal side portions, said supporting structure comprising a central bridge block and a pair of temporal end blocks spaced on opposed sides of said bridge block, and a long and narrow bar-like member channeled on its underside and having its central portion shaped to the upper contour shape of the bridge block and having its opposed end portions shaped to the upper contour shape of the respective temporal end blocks and with the upper edge of said blocks fitting within the channeled part of said portions of the bar-like member, the portions of said bar-like member between said bridge block and the respective temporal end blocks being shaped to the upper contour of the respective lenses to be assembled therewith and presenting channels for receiving said upper edges of the lenses, said bar-like member having depending portions extending along the lens-edge-directed-side of the respective temporal end blocks and bridge block and being channeled on their lens-edge-directed-side to receive the adjacent nasal and temporal edges of the lenses, separate channeled means for continuing along the respective downwardly and inwardly converging nasal and temporal sides of the lenses and being adapted to receive and grippingly interfit with said converging sides and having portions underlying the respective bridge and temporal end blocks and separable connection means on adjacent portions of said supporting structure and said separate channeled means for maintaining said separate channeled means in assembled relation with said depending portions whereby the blocks and lenses will be clampingly held in assembled relation with the bar-like member.

18. A lens supporting structure for the lenses of an ophthalmic mounting comprising a pair of temporal end blocks, a pair of long and narrow bar-like members extending throughout the width of the mounting, one having its outer end portions shaped to and fitting with the respective upper edges of said pair of temporal end blocks and the other having its outer end portions shaped to and fitting with the respective lower edges of said pair of temporal end blocks, the central part of said bar-like members being shaped into a central bridge portion with the portions of said bar-like members between said bridge portion and the respective temporal end blocks being inwardly channeled and shaped to receive the respective upper and lower contours of the lenses to be assembled therewith, the inner side surfaces of said bar-like members overlying the blocks and the adjacent surfaces of the blocks being shaped to have portions interfitting with each other, and a pair of plate-like members separate from and overlying the rear surface of each of said temporal end blocks and each being joined adjacent one end thereof with a respective one of each of the outer end portions of said bar-like members, said plate-like members carrying perforated lugs adjacent the meeting ends thereof for securing said ends together and to which temples may be pivotally connected, and connection means extending through the perforations thereof for retaining the blocks in interfitted relation with the respective outer end portions of the bar-like members and to retain the lenses in said supporting structure.

References Cited in the file of this patent
UNITED STATES PATENTS

| | | |
|---|---|---|
| 468,886 | Meigs | Feb. 16, 1892 |
| 1,109,285 | Haase | Sept. 1, 1914 |
| 1,235,842 | Reagan | Aug. 7, 1917 |
| 1,425,919 | Tremblay | Aug. 15, 1922 |
| 2,071,893 | Nerney | Feb. 23, 1937 |
| 2,093,513 | Nerney | Nov. 9, 1937 |
| 2,311,991 | Nerney | Feb. 23, 1943 |
| 2,345,065 | Nerney | Mar. 28, 1944 |
| 2,513,214 | Stegeman | June 27, 1950 |